No. 662,531. Patented Nov. 27, 1900.
J. H. GREENWOOD.
MECHANICAL BRAKE.
(Application filed Jan. 8, 1900.)
(No Model.) 2 Sheets—Sheet 1.
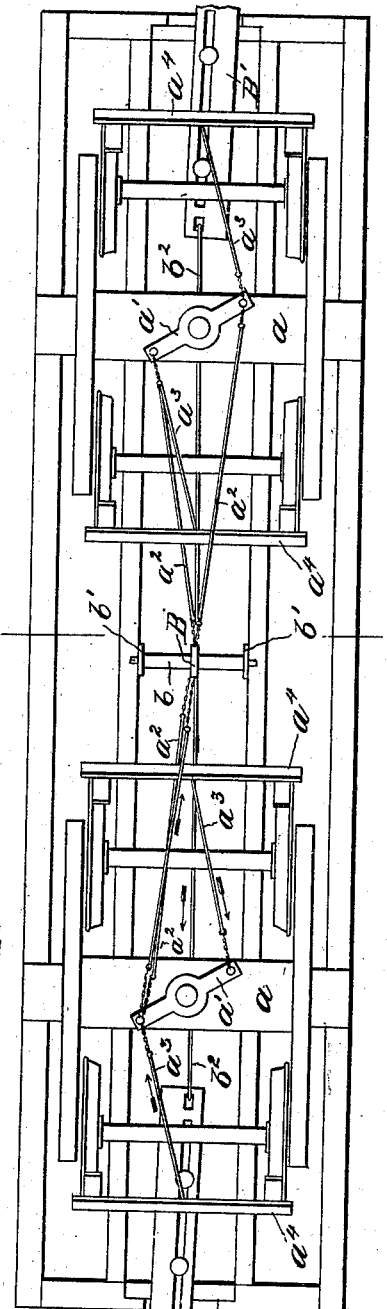
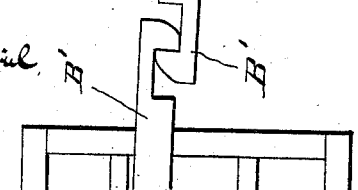
James H. Greenwood,
Inventor
By Marion & Marion
Attorneys

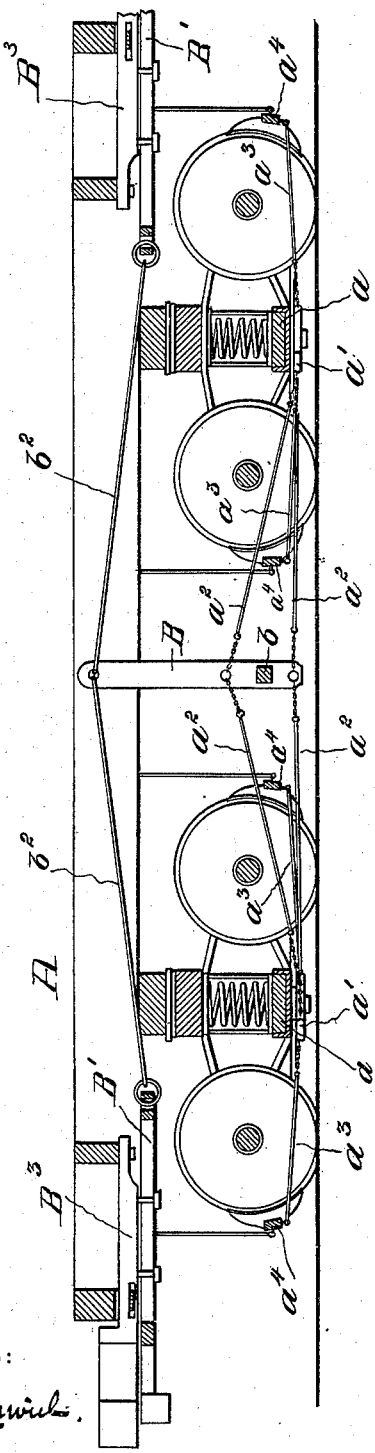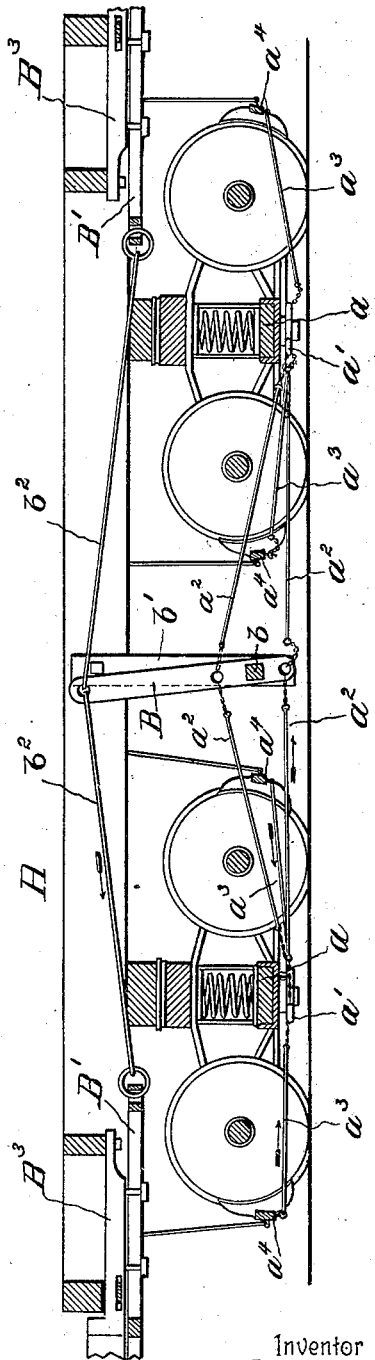

UNITED STATES PATENT OFFICE.

JAMES HARVEY GREENWOOD, OF BOISSEVAIN, CANADA, ASSIGNOR OF ONE-HALF TO THOMAS N. MORRISON, WILLIAM LONG, STEWART BURROWS, WILLIAM HANLEY, ROBERT F. MORRISON, AND JOHN MORROW, OF SAME PLACE.

MECHANICAL BRAKE.

SPECIFICATION forming part of Letters Patent No. 662,531, dated November 27, 1900.

Application filed January 8, 1900. Serial No. 768. (No model.)

*To all whom it may concern:*

Be it known that I, JAMES HARVEY GREENWOOD, a subject of Her Majesty the Queen of Great Britain, residing at Boissevain, county of Turtle Mountain, Province of Manitoba, Canada, have invented certain new and useful Improvements in Mechanical Brakes; and I do hereby declare that the following is a full, clear, and exact description of the invention, such as will enable others skilled in the art to which it appertains to make and use the same.

This invention relates to mechanical brakes for railroad-cars; and its object is to provide a brake of this character which is under the direct control of the engineer and which is simple in construction, effective and certain in operation, and which can be manufactured at a moderate cost.

To these ends the invention consists in a mechanical brake constructed substantially as hereinafter illustrated and described, and defined in the appended claim.

Referring to the drawings, in which similar letters of reference indicate similar parts, Figure 1 is a plan view of the frame of a car provided with a brake mechanism constructed in accordance with this invention. Fig. 2 is a transverse section taken on the line 2 2 of Fig. 1. Fig. 3 is a central longitudinal section showing the position of the parts when the brake is off. Fig. 4 is a similar view showing the position of the parts when the brake is on.

In the drawings, A represents the frame of a car, which may be of any usual or preferred construction, having the usual trucks, &c. Upon the beam $a$ is rotatably mounted the bar $a'$, to the ends of which are secured suitable wires or rods $a^2$ and $a^3$, whereby the bar $a'$ is connected with the lever B and to the brake-beams $a^4$, as best shown in Figs. 3 and 4. The lever B is fixed upon a shaft $b$, which is journaled in suitable bearings in the lower end of a bracket $b'$, fixed upon the frame of the car. The upper end of the lever B is connected by suitable rods $b^2$ with the ends of a draw-bar B', which is slidably secured to the coupler B³ by means of a pin-and-slot connection. As the coupler B³ is pivotally supported upon the frame of the car, so as to permit of its lateral movement, the draw-bar B' will also have a corresponding lateral movement, whereby it is adapted to be coupled and uncoupled with the next car by the movement of the coupler-bar.

It is apparent, in view of the above description, that, the draw-bars B' being connected throughout the train to the engine, the engineer is able to operate the brakes throughout the train by moving the draw-bars longitudinally through the medium of a lever or other suitable device. (Not shown.)

The operation of the improved brake mechanism will be sufficiently obvious in view of the above description without further detailed explanation.

While I have herein shown a preferred form of carrying my invention into effect, yet I do not desire to limit myself to such preferred details of construction, but claim the right to use any and all modifications thereof which will serve to carry into effect the objects to be attained by this invention, in so far as such modifications and changes may fall within the spirit and scope of my said invention.

I claim—

The combination with a brake mechanism, and draw-bars slidably mounted on a car for connection with and disconnection from other similar draw-bars, of a hanger suspended between the car-trucks, a vertically-disposed lever fulcrumed at a point intermediate of its length to said hanger, short levers $a'$ mounted on the trucks and each connected to the brake-beams thereon, connections between the short levers and the lower end of the vertically-disposed lever, and other connections between the upper end of the vertically-disposed lever and the draw-bars, substantially as described.

In witness whereof I have hereunto set my hand in the presence of two witnesses.

JAMES HARVEY GREENWOOD.

Witnesses:
R. C. DE OLLOQUI,
FRS. J. O'NEILL.